(12) United States Patent
Chung

(10) Patent No.: US 8,311,343 B2
(45) Date of Patent: Nov. 13, 2012

(54) VEHICLE CLASSIFICATION BY IMAGE PROCESSING WITH LASER RANGE FINDER

(75) Inventor: Jiyoon Chung, Aurora, CO (US)

(73) Assignees: Laser Technology, Inc., Centennial, CO (US); Kama-Tech (HK) Limited, Tsim Sha Tsui (HK)

( * ) Notice: Subject to any disclaimer, the term of this patent is extended or adjusted under 35 U.S.C. 154(b) by 946 days.

(21) Appl. No.: 12/370,483

(22) Filed: Feb. 12, 2009

(65) Prior Publication Data

US 2010/0202662 A1 Aug. 12, 2010

(51) Int. Cl.
*G06K 9/62* (2006.01)
(52) U.S. Cl. ........................ 382/224; 348/143
(58) Field of Classification Search .................. 382/100, 382/103, 106, 107, 155, 159, 165, 170, 224–228; 348/140, 143, 144, 148, 167–172; 701/29.6, 701/29.1
See application file for complete search history.

(56) References Cited

U.S. PATENT DOCUMENTS

| 5,515,448 A | | 5/1996 | Nishitani | |
| 5,757,286 A | * | 5/1998 | Jonsson et al. | 340/937 |
| 6,556,133 B2 | | 4/2003 | Ogura | |
| 6,985,827 B2 | * | 1/2006 | Williams et al. | 702/142 |
| 7,471,189 B2 | * | 12/2008 | Vastad et al. | 340/426.1 |
| 7,724,962 B2 | * | 5/2010 | Zhu et al. | 382/225 |
| 8,098,889 B2 | * | 1/2012 | Zhu et al. | 382/103 |
| 2004/0101166 A1 | * | 5/2004 | Williams et al. | 382/104 |
| 2005/0033505 A1 | * | 2/2005 | Zatz | 701/117 |
| 2005/0267657 A1 | * | 12/2005 | Devdhar | 701/35 |
| 2007/0263901 A1 | * | 11/2007 | Wu et al. | 382/104 |
| 2008/0069400 A1 | * | 3/2008 | Zhu et al. | 382/103 |
| 2008/0136625 A1 | * | 6/2008 | Chew | 340/540 |
| 2008/0273752 A1 | * | 11/2008 | Zhu et al. | 382/103 |

\* cited by examiner

*Primary Examiner* — Anand Bhatnagar
(74) *Attorney, Agent, or Firm* — William J. Kubida; Hogan Lovells US LLP

(57) ABSTRACT

An image capture device captures a plurality of sequential images of a vehicle in motion. At substantially the same time a collocated rangefinder determines the distance between the vehicle and the image capture device. Each of the plurality of images may be segmented based on the rangefinder point of reference. The portion of each image representing the vehicle is extracted based on its motion with respect to a stationary background. Knowing the size of the vehicle with respect to the image and the distance that the vehicle is from the image capture device, the image data is converted to real world dimensions. Using these real world dimensions a vehicle classification is determined.

30 Claims, 8 Drawing Sheets

VEHICLE CLASSIFICATION BY IMAGE PROCESSING WITH LASER RANGE FINDER

BACKGROUND OF THE INVENTION

1. Field of the Invention

Embodiments of the present invention relate, in general, to systems and methods for vehicle image classification and particularly to extracting from an image real world dimensions of a vehicle that can thereafter be used for vehicle classification.

2. Relevant Background

In several jurisdictions traffic restrictions exist that are applied to vehicles based on the size of the vehicle or the vehicle's position on the roadway. For example, in several countries speed limits vary for each lane in a roadway and for particular types of vehicles. A passenger car may be governed by one speed limit while in the same lane a large truck may be restricted to a lower speed. It is also very common in congested areas for large vehicles to be prohibited from operating in one or more particular lanes of a roadway.

Automated traffic monitors such as camera speed enforcement devices or cameras associated with stop lights are currently incapable of differentiating between various classes of vehicles. Such devices are increasingly popular in areas in which it is either infeasible or prohibited to employ human enforcement of traffic laws. For example, several countries such as South Korea and Japan do not recommend the use of human resources for traffic enforcement citing an increased risk of injury to not only the traffic officer but to the public in general. In these jurisdictions traffic enforcement is conducted via sensors that monitor the speed of traffic at a particular location and, when a violation is detected, capture an image of the violator. Fines and penalties arrive in the violator's mail shortly thereafter.

Currently, the automated speed monitoring systems that conduct unsupervised law enforcement are triggered by a speed detection device such as sensors in the pavement, RADAR guns or Laser based speed detection devices. At present, these techniques are indiscriminate in their application. Thus, while this type of system works well for simple enforcement of a maximum speed limit, it fails to address variable speed restrictions or other ordinances based on vehicle classification. For example, a truck traveling over the posted speed limit for a large vehicle would not trigger a violation as long as it remained below the maximum speed for another, presumably smaller vehicle. Similarly, a commercial truck violating a lane restriction ordinance would go undetected by current monitoring devices as long as the truck's speed remained below the trigger speed for that lane.

SUMMARY OF THE INVENTION

Disclosed are systems and methods for image based vehicle classification. According to one embodiment of the present invention, an image capture device such as a digital camera is configured to capture a plurality of sequential images of a vehicle in motion. The sequence of images capture the vehicle, and any other objects that are within the camera's frame of reference, with respect to a substantially stationary background. According to one embodiment of the present invention, a rangefinder device that is collocated with the image capture device simultaneously determines the distance between the vehicle and the image capture device. Each of the plurality of images is segmented using a seed point. The seed point is identified as the target reference of the rangefinder device. Using the seed point as a starting point, each portion of an area of interest within the image is segmented.

Once segmented, the portion of each image representing the vehicle is extracted. Knowing the size of the vehicle with respect to the image and the distance that the vehicle is from the image capture device, the image data is then converted to real world dimensions. Using these real world dimensions a vehicle classification is determined. According to one embodiment of the present invention, the classification process is coupled with one or more databases that include a plurality of vehicle attributes including vehicle dimensions. The determined real world dimensions of the target vehicle are compared to attributes of known vehicle classifications to ascertain a classification for the vehicle. Once the vehicle has been classified, the determination of whether a violation has occurred is performed.

According to another embodiment of the present invention, the rangefinder is a laser rangefinder. The laser rangefinder precisely determines the distance to both the vehicle captured in the image and the substantially stationary background. Once segmented, the vehicle is extracted from the image by comparing the change in the position of the vehicle with respect to the stationary background of the previous image in a process known as motion flow extraction.

According to another embodiment of the present invention, a computer-readable storage medium embodies programmable instructions that are executable by a processor for image based vehicle classification. The processor is communicatively coupled to an image capture device, a rangefinder device, and the storage medium housing the programmable instructions. These instructions direct the retrieval of a plurality of sequential images depicting a plurality of moving objects with respect to a substantially stationary background including, among them, a vehicle. The programmable instructions further include code for determining the distance between the image capture device and the vehicle as well as code for segmenting each image so as to extract the vehicle portion from the remainder of the image. Once the image of the vehicle has been extracted, program code for converting the image based data to real world dimensions is executed. The real world dimensions of the vehicle are, according to another aspect of the present invention, compared to databases of vehicle attributes to arrive at a specific vehicle classification.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more exemplary embodiments taken in conjunction with the accompanying drawings, wherein.

Figure 1:
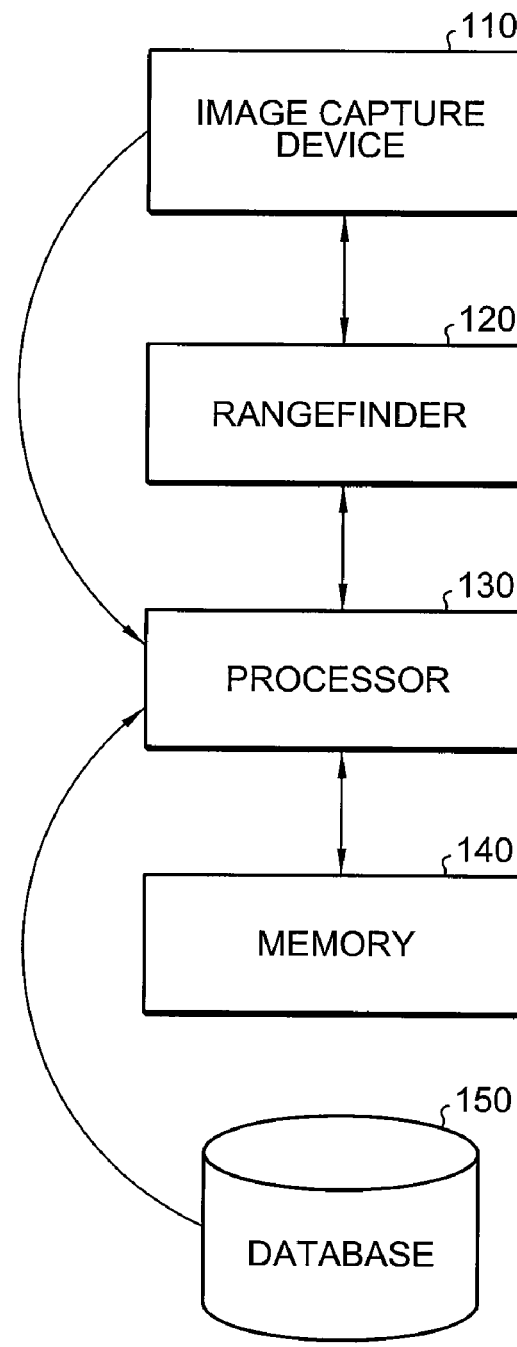
FIG. 1 shows a high level functional block diagram of a system for image based vehicle classification according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXEMPLARY EMBODIMENTS

Systems and methods for image based vehicle classification are described. According to one embodiment of the present invention, an image capture device, such as a digital camera or video recorder, captures a plurality of sequential images of a vehicle as it moves past a substantially stationary background. Both the vehicle and the background are within the field of view and the depth of image. Associated with the image capture device is a rangefinder device. According to one embodiment of the present invention, the rangefinder device determines the distance from the image capture device to the vehicle.

The plurality of images and the distance information are communicated to a processor where, according to embodiments of the present invention, the image of the vehicle is extracted from the image and converted from an image coordinate system to a real world coordinate system. Once converted, the actual dimensions of the vehicle are ascertained and thereafter compared to a database of vehicle attributes to classify the vehicle.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 is a high level functional block diagram of an image based vehicle classification system 100 according to one embodiment of the present invention. As shown, an image capture device 110 is communicatively coupled to a rangefinder 120 and a processor 130 (or other machine capable of executing computer-readable code or instructions). The processor 130 is further communicatively coupled to a memory 140 and, in one embodiment of the present invention, a database 150.

In one embodiment of the present invention, the memory 140 is local to the processor and can be of various forms of persistent, or non-volatile, memory including flash, disk, magnetic tape, and the like. While certainly capable of performing other tasks, the memory 140 serves as the primary source and storage means for programmable instructions executed by the processor 130 for image based vehicle classification. The database 150, which can also be local to the processor 130, is also communicatively coupled to the processor 130. The database 150 contains vehicle attributes including, among other things, dimension information. For example, the database 150 may include a plurality of types of vehicles, generally classified as trucks, that possess a range of dimensions. Other dimensions may be classified as passenger vehicles, utility vehicles, trailers, busses, etc. In one embodiment of the present invention, the database 150 may be remotely located from the system 100 and linked via a wired or wireless connection. The database may also be accessible via a wide area network such as the Internet or maintained within, or associated with, the unit embodying the vehicle classification system 100.

According to one embodiment of the present invention, the image capture device 110 is a digital camera capable of recording a plurality of images, sequentially, over a short period of time. The format of the images may vary but can include JPEG, GIF, PNG, TIF, and the like, as will be appreciated by one skilled in the art. Similarly the rangefinder device 120 can be of a variety of designs including RADAR, Laser, Optical, and other means of accurately determining the distance between two points. In one embodiment of the present invention, a Laser rangefinder is used to precisely determine the distance between the image capture device 110 and the vehicle. Various designs of such Laser rangefinders can be used in conjunction with the present invention including those of Laser Technology, Inc. of Centennial, Colo., the assignee of the present invention. Indeed laser rangefinders can accurately and quickly determine the distance to an object with minimal computational cost.

Figure 2:
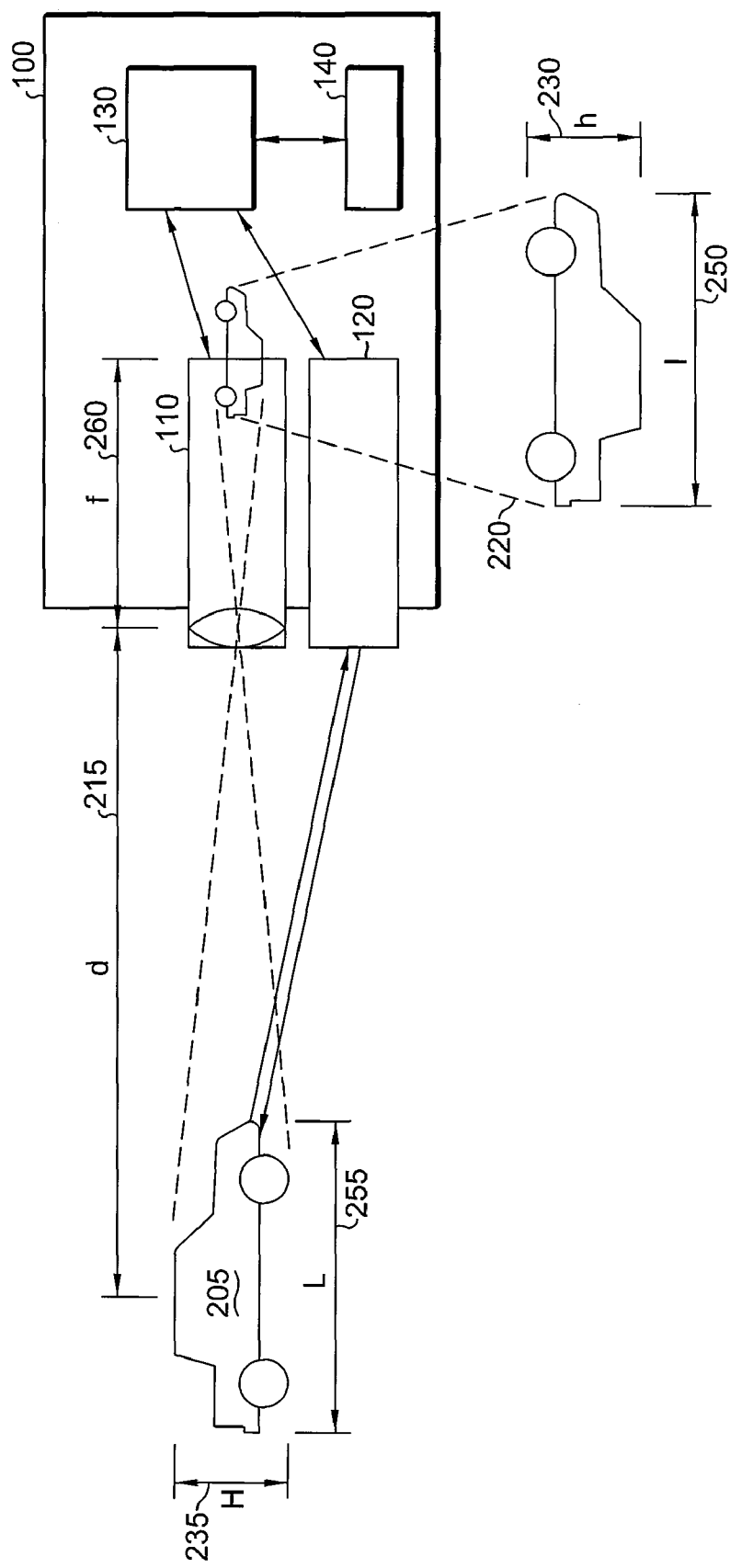
FIG. 2 shows a side elevational view of an image of a vehicle captured by an image capture device associated with distance data determined by a rangefinder according to one embodiment of the present invention.

FIG. 2 shows a landscape view of an image of a vehicle captured by an image capture device combined with distance data determined by a rangefinder, according to one embodiment of the present invention. Upon initiation of the image based vehicle classification system 100, the image capture device 110 captures a plurality of sequential images of the vehicle 205. Simultaneously, for each captured image, the rangefinder 120 determines the distance (d) 215 to the vehicle, which is then associated with the image for further processing. The image capture device 110 and rangefinder 120 are ideally collocated and co-axial so as to eliminate any parallax error and may, in a particular embodiment disclosed herein, be in a single, unitary, hand-held housing. In other embodiments they may reside along side one another and be in substantially the same plane (as shown in FIG. 2). As the distance (d) 215 is proportionally very large in comparison to the lateral displacement between the image capture device 110 and the rangefinder 120 and by virtue of the small angle theory, the offset can be ignored.

As will be appreciated by one skilled in the art, the size of the vehicle in real world dimensions can be determined from the image once the distance between the image capture device 110 and the vehicle is determined. The image of the vehicle 205 is captured in pixels according to an image coordinate system. For example, the entire image may have a field of view of 1000 pixels by 3000 pixels. As one skilled in the art can appreciate, the number of pixels can vary depending on the capability of the image capture device. The aforementioned example would be a 3 megapixel image. Within that image the vehicle may possesses the dimensions, in image terms, of 500 pixels by 1000 pixels. While the relationship of the width to height of the vehicle in pixels is valuable, it is nonetheless inadequate to form an accurate vehicle classification. Such a classification can be accomplished by converting these image coordinate values to real world dimensions.

Accordingly, and as shown in the example of FIG. 2 and as appreciated by one skilled in the relevant art, the actual height (H) 235 of the vehicle 205 is proportional to the image height (h) 230. As shown in the expanded focal image 220 of the image capture device 110, the conversion of image to real world values is a function of the distance (d) 215 and the focal length (f) 260. Note that the focal length (f) 260 is a known predetermined value. Expressed mathematically this relationship is: H:d=h:f. Similarly, the actual length (L) 255 of the vehicle 205 is to distance (d) 215 as the image length (l) 250 is to the focal length (f) 260. Again mathematically this relationship is expressed as: L:d=l:f.

Knowing the focal length (f) 260, the distance (d) 215 (by virtue of the rangefinder 120), and the image dimensions (h or l respectively), the actual dimensions of the vehicle can be determined. For example, the real world height (H) 235 is equal to the product of the image height (h) 230 with the quotient of the distance (d) 215 over the focal length (f) 260, or H=h*(d/f).

According to one embodiment of the present invention, computational resources can be minimized and speed of results maximized by segmenting the image and extracting the vehicle from that segmented image. By segmenting the image, various objects within the image, such as the vehicle, can be isolated for analysis. Extraction of a specific image, such as the vehicle to be classified, enables computational resources to be focused on returning the most applicable results.

For example, a single image taken by the image capture device 110 will include a plurality of objects. An image can include a vehicle, a tree, several birds, a road sign, and the like. Each of these objects can be segmented, and for each object the real world dimensions can be determined using the techniques described above. Once the dimensions of every segmented object have been found, these dimensions can be compared to the database of vehicle attributes to arrive at a likely match. As one can appreciate most objects in the image will not have a match in the vehicle attribute database using this approach. For example, the dimensions of a bird in an image are not likely to match any real world vehicle dimensions.

To reduce the computational tasks associated with image vehicle classification, and according to one embodiment of the present invention, only select objects or portions of each image are converted to real world dimensions and matched against the vehicle attribute database. This selective processing is accomplished, according to one embodiment, via a combination of motion flow extraction and targeted image segmentation.

Motion flow extraction compares a segmented portion of an image over a plurality of sequential images. When the segmented portion is moving with respect to a substantially stationary background, the difference in pixels can be detected. For example, assume the only objects of interest in an image are those possessing motion with respect to the background. Also assume that the background is substantially stationary. For the purposes of image vehicle classification with respect to the present invention, both of these assumptions hold valid. Thus, looking at a series of sequential images, those objects that are in motion with respect to the background can be extracted from the image. To better understand the significance of the extraction consider the images presented in FIG. 3.

Figure 3:
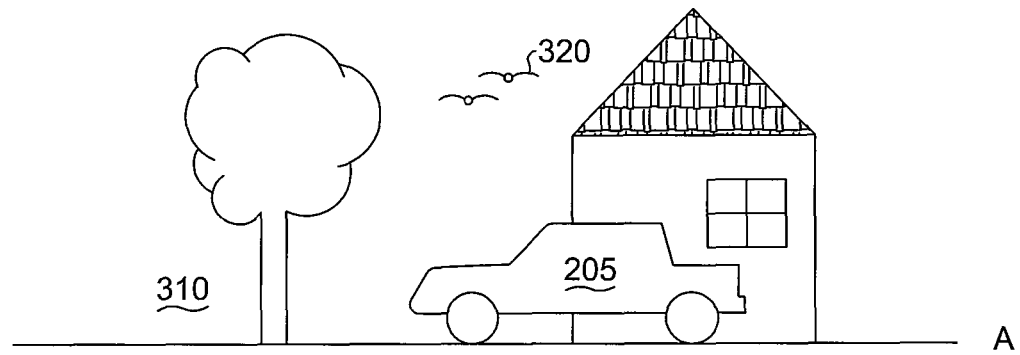
FIG. 3 shows a plurality of sequential images captured by an image capture device according to one embodiment of the present invention.
Figure 3:
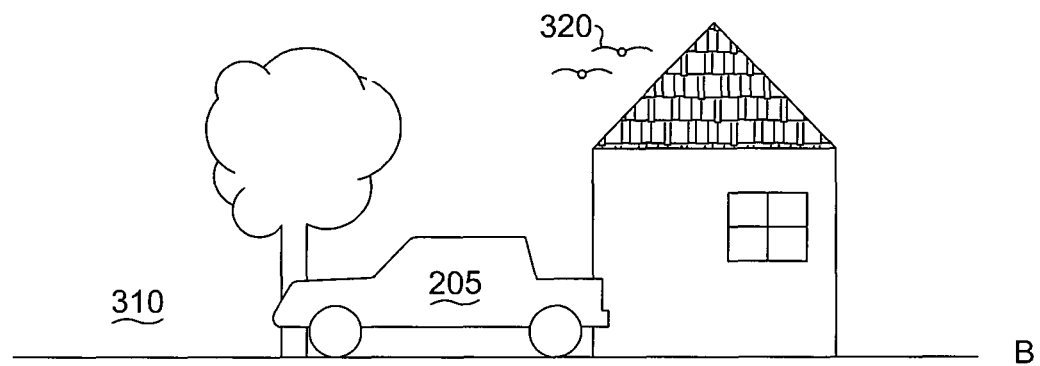
Figure 3:
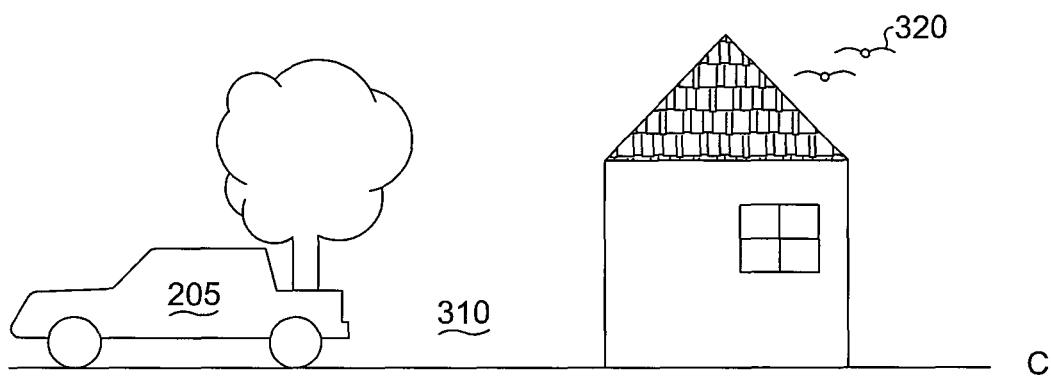

FIG. 3 shows a plurality of sequential images captured by an image capture device according to one embodiment of the present invention. The sequential images shown in FIGS. 3A through 3C include a vehicle 205 moving from right to left, two birds 320 moving from left to right, and a stationary background 310 that is comprised, for purposes of simplicity, of a tree and a house. An application of motion flow extraction to these images as described above would eliminate the stationary background from the extraction process. A comparison of images in FIGS. 3A to 3B and then a comparison of FIGS. 3B to 3C would find no relative shift of the pixels associated with the stationary background 310, the house and tree, while those pixels associated with the vehicle 205 and the birds 320 would change.

According to one embodiment of the present invention, the moving portions of the images, the birds 320 and the vehicle 205, are identified as objects of interest. To further reduce the computational tasks of the processor 130 the present invention employs a targeted segmentation technique. According to this embodiment of the present invention, the rangefinder is used to seed or initiate the segmentation process. From this starting point image segmentation identifies the primary object or objects of interest. In this case the object of interest would be the vehicle 205. By combining the targeted segmentation of the images captured by the image capture device with the motion flow extraction, the portion of the image representing the vehicle can be isolated from the remaining objects. That isolation eliminates from consideration both the stationary background 310 as well as other objects in motion such as the birds 320 and the like. This combination of processes minimizes the computational requirement for the conversion of image dimensional data to real world coordinates and the requirement for matching those dimensions to the vehicle attribute database.

Figure 4:
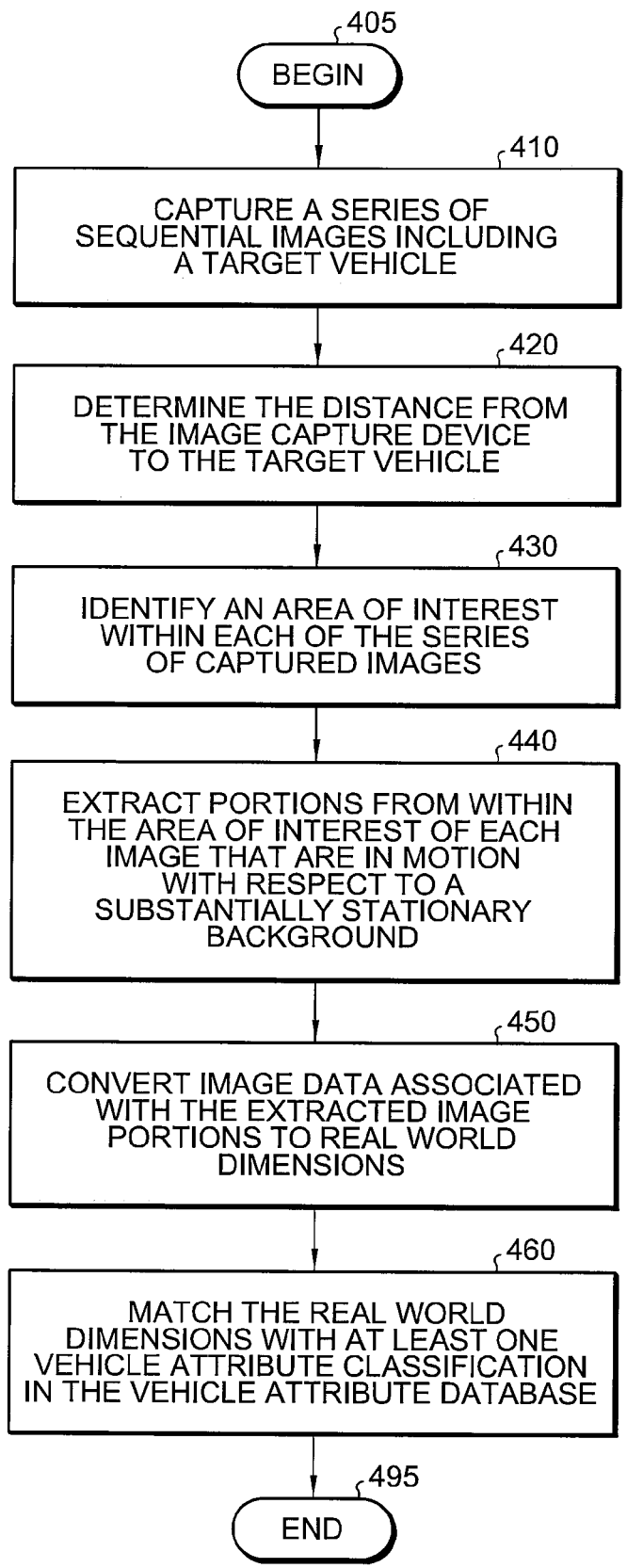
FIG. 4 shows a flowchart of one method for possible implementation of an image based vehicle classification technique according to the present invention.

FIG. 4 shows a flowchart for one method for possible implementation of an image based vehicle classification according to the present invention. In the following description, it will be understood that each block of the flowchart illustrations, and combinations of blocks in the flowchart illustrations, can be implemented by computer program instructions implemented, for example, by processor 130. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As previously described and as shown in FIG. 4, the process begins at point 405 with the capturing at step 410 of a series of sequential images by an image capture device. Included in each of these images is a target vehicle. At substantially the same time that each of these images is captured, the distance between the image capture device and the vehicle is determined at step 420. Using the precision associated with a laser rangefinder, according to one embodiment of the present invention, an area of interest of each of the series of captured images is identified at step 430. Within this area objects or portions of the image are segmented. Those portions that are found to be in motion with respect to a substantially stationary background are extracted at step 440 from each image for further processing.

Thereafter the image data associated with each extracted object relating to the dimensions of the object are converted at step 450 to real world dimensions. Once the real world dimensions of the vehicle are known, the database of vehicle attributes is accessed and a comparison is effectuated to match, at step 460, the real world dimensions of the object of interest in the image, (e.g. the vehicle), with those found in the database. With a match identified the process ends at step 495.

Figure 5:
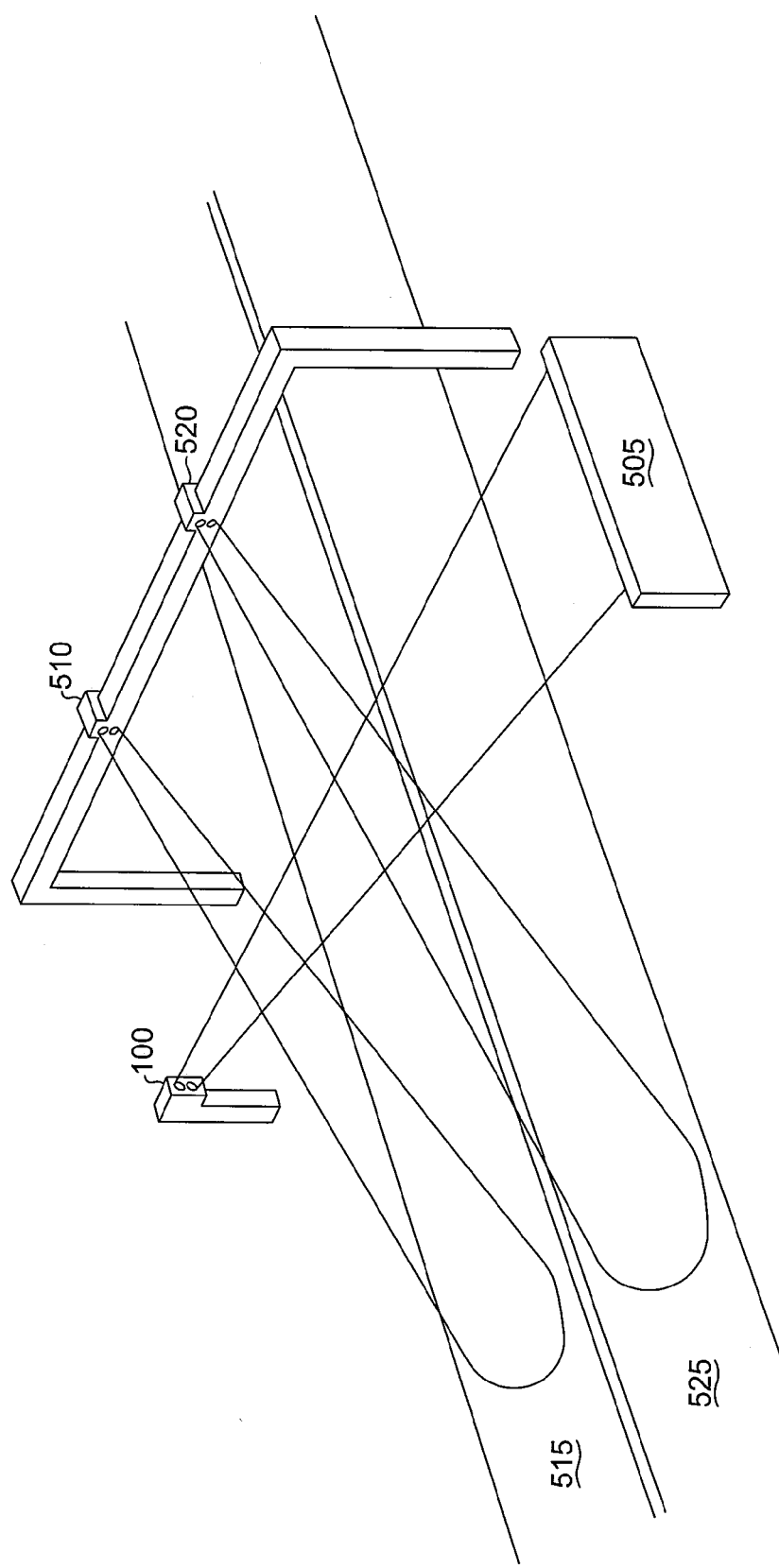
FIG. 5 shows a possible implementation of a system for image based vehicle classification according to one embodiment of the present invention.

FIG. 5 show a possible implementation of a system 100 for image based vehicle classification according to one embodiment of the present invention. As one skilled in the art of vehicle ordinance enforcement will appreciate, aspects of the present invention can be utilized in a variety of implementations. According to another embodiment of the present invention, an image based vehicle classification system 100 can be combined with a stationary or hand-held speed detection device to aid in the enforcement of various traffic rules, regulations and/or ordinances.

As previously mentioned, various jurisdictions may place varied restrictions with respect to the use of certain traffic lanes based on the classification of the vehicle. For example, a truck may be limited to a lower speed than a passenger car in a given lane or may be prevented from the use of that lane entirely. FIG. 5 shows one configuration for ordinance enforcement using a fixed implementation of an image based vehicle classification system 100. The image based vehicle classification system 100 of the present invention can be placed so as to establish a view of the roadway that is perpendicular to the motion of traffic. In this example the image based vehicle classification system 100 is directed across two lanes of traffic 515, 525. On the opposing side of the roadway, a substantially fixed background 505 might be erected to maximize the ability of the system 100 to differentiate moving objects from the stationary background.

Included in this implementation is a means to determine the speed of vehicles in each lane 515, 525. In this exemplary implementation, speed detection devices 510, 520 are directed at respective traffic lanes and each device is separately communicatively coupled to the image based vehicle classification system 100. Each speed detection device can be set to monitor traffic in each respective lane so as to initiate the image based vehicle classification system 100 at the appropriate time. For example, assume the posted speed for the left most lane 515 is 75 miles per hour for passenger vehicles and 60 miles per hour for certain classifications of trucks. The speed detection device 510 for the left lane 515 can be configured to initiate image based vehicle classification for any vehicle traveling at speeds in excess of 60 miles per hour.

By correlating the measured speed with the resulting vehicle classification, those vehicles matching the classification of trucks limited to the lower speed limit can be detected and, if necessary, cited. Similarly ordinances with respect to weight limits per axial and lane restrictions can also be enforced. These and other implementation methodologies for image based vehicle classification can be successfully utilized.

In a portable, unitary, battery powered, hand-held implementation of the system 100 of the present invention, as will be more fully disclosed hereinafter, the system 100 can be used to classify vehicles at positions other than perpendicular (or 90 degrees) to the flow of vehicular traffic. In particular, the system 100 is operative to determine the classification of vehicles at angles of less than approximately 10 degrees or greater to the flow of either approaching or departing traffic.

Figure 6:
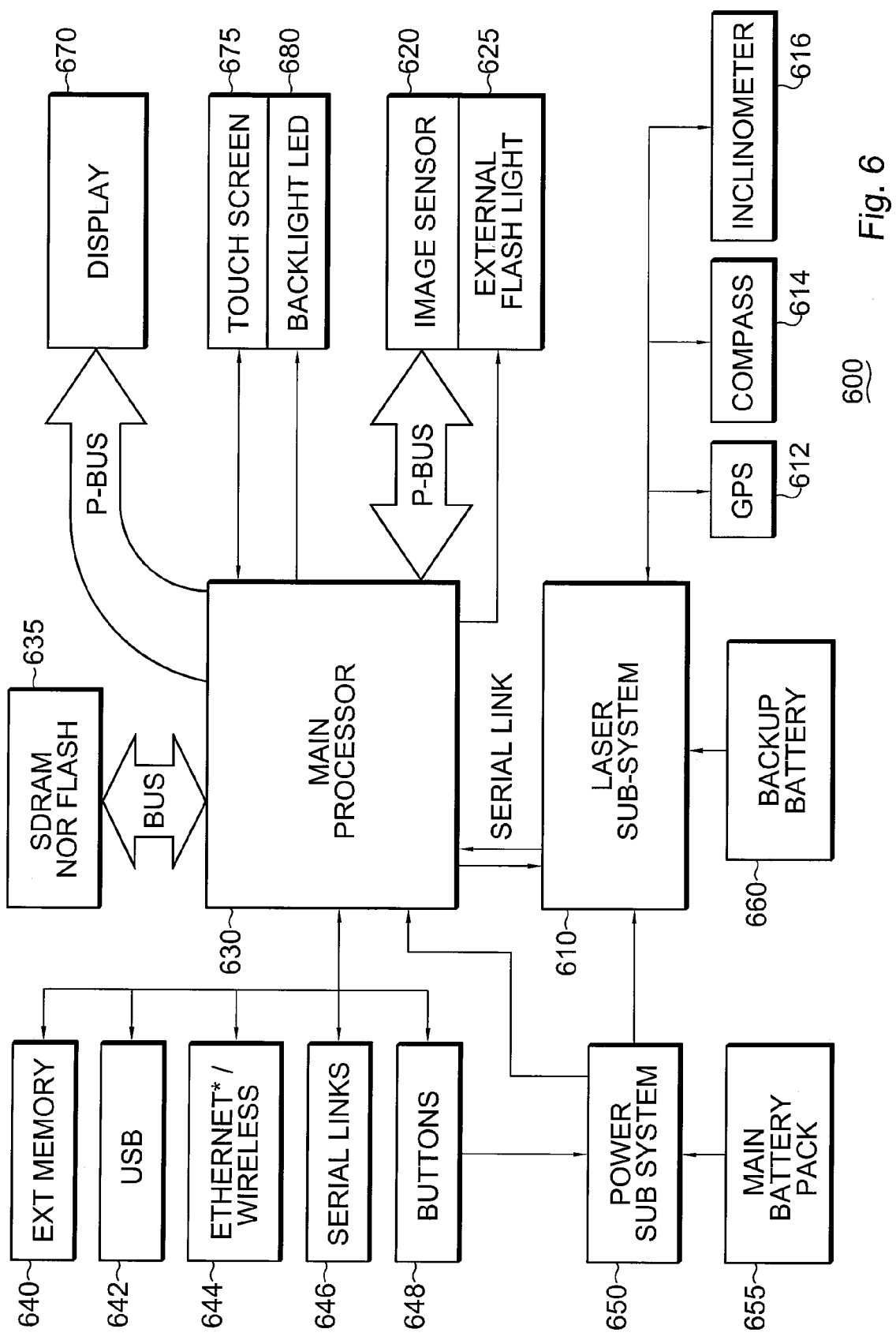
FIG. 6 is a high level block diagram for an embodiment of an integrated image and speed measurement system according to another embodiment of the present invention, which may also incorporate a vehicle classification system.

FIG. 6 is a high level block diagram depiction of a portable, hand-held system 600 which integrates vehicle imagery in conjunction with distance measuring equipment as disclosed in U.S. patent application Ser. No. 12/236,288 filed Sep. 23, 2008 for: "Integrated Still Image, Motion Video and Speed Measurement System", assigned to Laser Technology, Inc., assignee of the present invention. The disclosure of the aforementioned patent application is herein specifically incorporated by this reference in its entirety.

The system 600 is generally comprised of a distance measuring device such as a laser rangefinder (e.g. laser subsystem 610), an image sensor 620 and a processor 630. The distance measuring device may, in an exemplary embodiment, comprise a laser rangefinder sub-system 610 controlled by a conventional embedded processor 630 such as an NXP LPC2136. This laser sub-system 610 can include local memory for intermediate calculations distance determination and can also be linked to a global positioning system component 612, a compass 614 and an inclinometer 616.

The system 600 may be implemented on any conventional central processing unit(s) (CPU) or processor(s) 630 such as an ATMEL AT32AP7000 processor or the like. The image sensor 620 may comprise a Complementary Metal Oxide Semiconductor ("CMOS") image sensor with the ability to dynamically adjust resolution from a motion image of 480× 360 pixels to a still image resolution of 1920×1440 pixels. Other embodiments of the image sensor 620 can include an external flash light 625 for low light operations. While the CMOS image sensor 620 is coupled to the processor 630 via a peripheral bus, the distance measuring device of the laser sub-system 610 may be coupled to the processor 630 via a serial link. The system 600 also includes random access memory 635 ("RAM") in the form of synchronous dynamic RAM (SDRAM) and/or NOR of NAND Flash coupled to the processor 630 via a memory bus.

Further coupled to the processor are ancillary ports such as an SD card slot interface (external memory interface) 640, a USB port 642, an Ethernet, wireless Ethernet or other network port 644, serial links 646 and various I/O interfaces 648 such as for user actuatable buttons. These I/O interfaces 648 are further coupled to a power supply 650 sub-system that regulates power supplied by a main battery pack 655 which also supplies power to the laser-subsystem 610, processor 630 and other elements of the system 600. A backup battery pack 660 may also be coupled to the laser sub-system to provide power to the real-time clock and GPS aid in an improved acquisition time.

Further coupled to the processor 630 via the peripheral bus is a display device 670, such as a color liquid crystal display (LCD). In one embodiment of the present invention, the display 670 can include a touch screen 675 for user input/output functionality and backlight light emitting diodes 680 for low light level operations. Although not shown separately, a real time system clock is included with the system 600, in a conventional manner.

The processor (CPU) comprises a suitable processor 630 for implementing the present invention. The CPU communicates with other components of the system via a bi-directional system bus (including any necessary input/output (I/O) controller circuitry and other "glue" logic). The bus, which includes address lines for addressing system memory, provides data transfer between and among the various components. RAM 635 serves as the working memory for the CPU. Read only memory present within the processor may contain the basic input/output system code (BIOS), in the form of a set of low-level routines in the ROM that application programs and the operating systems can use to interact with the hardware, including reading characters from the keyboard, outputting characters to printers, and so forth.

Mass storage devices 640 can be used to provide persistent storage on either fixed or removable media, such as magnetic, optical, or magneto-optical storage systems, flash memory, or any other available mass storage technology. The mass storage may be shared on a network, or it may be a dedicated mass storage forming a part of the system 600. The computer system displays text and/or graphic images and other data on the display device 670. A video adapter, which is interposed between the display 670 and the system's bus, drives the display device 670. A hard copy of the displayed information, or other information within the system 600, may be obtained from a printer or other output device. The system 600 may communicate with other devices (e.g., other computers) via a network interface card (NIC) connected to a network (e.g., Ethernet network, Bluetooth wireless network, or the like) via the link 644. Devices that will be commonly connected locally to the interface include laptop computers, handheld organizers, digital cameras, and the like.

With respect to the image based vehicle classification system 100 of the present invention, the image capture device 110 may be implemented by the image sensor 620 of the system 600, while the rangefinder 120 function may be performed by the laser sub-system 610. The processor 130 functionality of the system 100 of the present invention may be performed by the processor 630 while the RAM 635 may be used as the system memory 140. The database 150 of the present invention may be implemented in the form of persistent storage coupled to the external memory block 640 or USB port 642 or may be located remotely from the system 100 through the wireless interface 644.

Figure 7A:
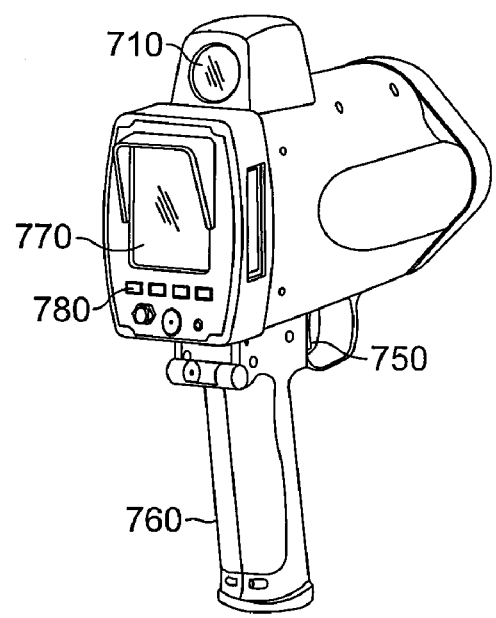
FIGS. 7A and 7B are, respectively, right rear and front perspective views of another possible embodiment of the present invention encompassing a unitary, battery powered, hand-held instrument including a laser range finder for use with an image processing system for effectuating vehicle classification.
Figure 7B:
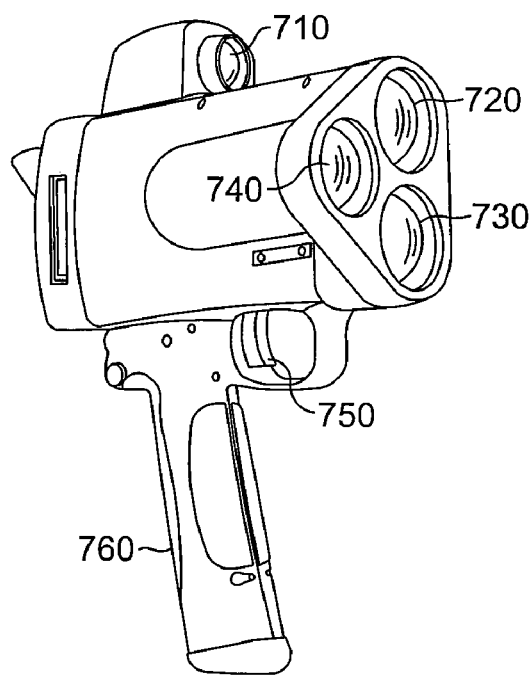

An exemplary physical implementation of a vehicle classification by image processing system 100 in accordance with another embodiment of the present invention is shown in FIGS. 7A and 7B. FIG. 7A shows a right rear perspective view of such a system 100 while FIG. 7B shows a right front perspective view of the same portable, unitary, battery powered, hand-held device.

Referring first to FIG. 7B, one embodiment of an apparatus for housing the system 100 of the present invention includes targeting optics, or a sight, 710 affixed to or integrated with the apparatus. Through use of the sight 710, the user can initially direct the system 100 toward a given moving object. The housing shown in FIGS. 7A and 7B also includes a signal transmission port 720 for transmitting range finding pulses used in conjunction with a distance measuring device as well as a signal reception port 730 for reception of target reflected energies. In the case of a laser rangefinder 120 a series of laser pulses is transmitted from the transmitter port toward the moving object. The reflected counterparts of these pulses are detected by the receiving port 730 after a finite period of elapsed time. The system uses this elapsed time to determine the distance to the object. As the distance changes over a period of time, the speed of the object can be determined.

Substantially adjacent and co-aligned with both the sight 710 and the transmitting port 720 is an optical lens 740 that is used by the image capture device 110. The system 100, according to one embodiment, is actuated (or initiated) by a user enabled trigger 750.

The apparatus shown in FIGS. 7A and 7B also includes a handle 760 facilitating the aiming of the device by a user toward a moving object of interest and aiding in its portability. Turning to FIG. 7A, a display device 770 is shown as well as a plurality of user interface controls 780 to facilitate the operation of the system 100.

Figure 8A:
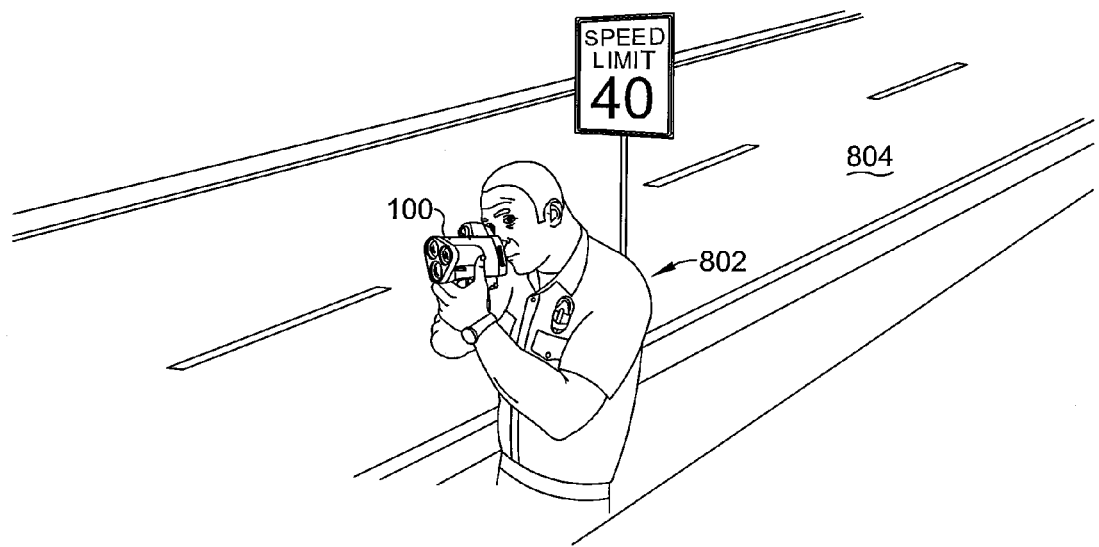
FIGS. 8A and 8B are, respectively, front left and right rear perspective views of the hand-held embodiment of the present invention of FIGS. 7A and 7B as may be used by a law enforcement officer or other individual to effectuate vehicle classification of both approaching and receding traffic.
Figure 8B:
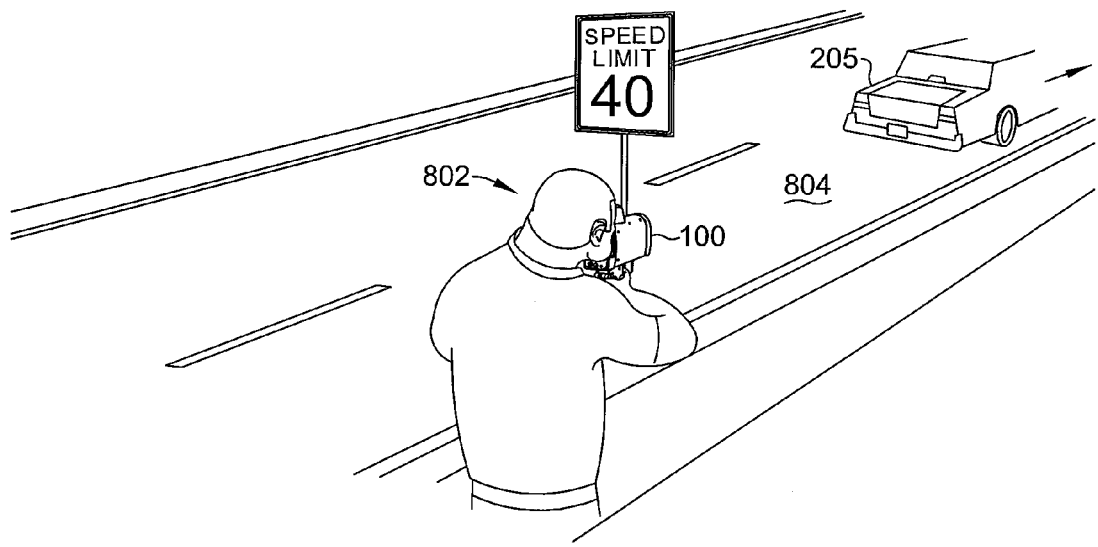

FIGS. 8A and 8B show, respectively, front left and right rear perspective views of the hand-held embodiment of the system 100 of the present invention as shown in FIGS. 7A and 7B as the same might be utilized by a law enforcement officer or other individual 802 to effectuate vehicle 205 classification of both approaching and receding traffic along a roadway 804. As previously mentioned, the system 100 can be used to classify vehicles at positions other than perpendicular (or 90 degrees) to the flow of vehicular traffic. In particular, the system 100 is operative to determine the classification of vehicles at angles of less than approximately 10 degrees or greater to the flow of either approaching (FIG. 8A) or departing (FIG. 8B) traffic.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

While there have been described above the principles of the present invention in conjunction with specific computer executable instructions to classify vehicles based on captured images, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A system for image based vehicle classification, the system comprising:
    an image capture device configured to digitally capture a plurality of images wherein each of the plurality of images includes representations of a plurality of moving objects moving with respect to a substantially stationary background and wherein at least one representation of the plurality of moving objects is a representation of a vehicle;
    a rangefinder device configured to determine distance between the vehicle and the image capture device; and
    a processor, communicatively coupled to the image capture device and to the rangefinder device, configured to:
    extract the representation of the vehicle from the plurality of images,
    convert image data associated with the representation of the vehicle to a set of physical dimensions associated with the vehicle, and
    classify the vehicle based on the set of physical dimensions associated with the vehicle.

2. The system of claim 1 wherein said processor is further configured to:
    segment each of the plurality of images and differentiate the representation of the vehicle from each representation of the plurality of moving objects remaining in each image.

3. The system of claim 1 wherein each of the plurality of images digitally captured by the image capture device is associated with an image coordinate system that defines image size based on pixels.

4. The system of claim 1 wherein the rangefinder device is a laser rangefinder.

5. The system of claim 1 wherein the rangefinder device and the image capture device are collocated.

6. The system of claim 1 wherein the system is a hand-held device.

7. The system of claim 6 wherein said hand-held device is operative from a self-contained power supply.

8. The system of claim 1 wherein the rangefinder device identifies a seed point associated with the representation of the vehicle.

9. The system of claim 8 wherein the seed point is a reference point on the representation of the vehicle from which to begin image segmentation.

10. The system of claim 1 further comprising a memory communicatively coupled to said processor, said memory including a plurality of attributes associated with each of a plurality of vehicles wherein at least one of the plurality of attributes includes physical dimensions of each of the plurality of vehicles.

11. The system of claim 10 wherein said plurality of attributes are maintained within a database of a hand-held device comprising said image capture device, said rangefinder device and said processor.

12. A method for image based vehicle classification, said method comprising:
    capturing digitally a plurality of images using an image capture device wherein each of the plurality of images includes a plurality of moving objects images moving with respect to a substantially stationary background and wherein at least one of the plurality of moving objects images is a vehicle image that is associated with a vehicle;
    determining a distance between the vehicle and the image capture device;
    extracting the vehicle image from the plurality of images;
    converting data associated with the vehicle image to a set of physical dimensions associated with the vehicle; and
    classifying the vehicle based on the set of physical dimensions associated with the vehicle.

13. The method of claim 12 further comprising:
    segmenting the vehicle image from the plurality of moving object images remaining in each of the plurality of images.

14. The method of claim 12 wherein capturing includes associating each of the plurality of images with an image coordinate system that defines image size based on pixels.

15. The method of claim 12 wherein the distance determination is accomplished by a rangefinder device collocated with the image capture device.

16. The method of claim 15 wherein the rangefinder device is a laser rangefinder.

17. The method of claim 12 wherein segmenting includes identifying a seed point associated with the vehicle image.

18. The method of claim 17 wherein the seed point is a reference point on the vehicle image from which to initiate image segmentation.

19. The method of claim 12 wherein extracting includes comparing motion of the vehicle image segmented from the plurality of moving object images remaining in each of the plurality of images to the substantially stationary background.

20. The method of claim 12 wherein classifying includes accessing a memory wherein said memory includes a plurality of attributes associated with each of a plurality of vehicles and wherein at least one of the plurality of attributes includes physical dimensions of each of the plurality of vehicles.

21. A computer-readable storage medium tangibly embodying a program of instructions executable by a processor wherein said program of instructions comprises a plurality of program codes for image based vehicle classification said program of instructions comprising:
    one of said program codes for retrieving from an image collection device a plurality of images wherein each of the plurality of images includes a plurality of moving objects images moving with respect to a substantially stationary background and wherein at least one of the plurality of moving objects images is a vehicle image that is associated with a vehicle;
    program code for communicating to the processor distance information between the image collection device and the vehicle as determined by a rangefinder device;
    program code for extracting the vehicle image from the plurality of images;

program code for converting data associated with the vehicle image to a set of physical dimensions associated with the vehicle; and program code for classifying the vehicle based on the set of physical dimensions associated with the vehicle.

22. The computer-readable storage medium of claim 21 further comprising:

segmenting the vehicle image from the plurality of moving object images remaining in each of the plurality of images.

23. The computer-readable storage medium of claim 21 wherein the program code for segmenting includes code for identifying a seed point associated with the vehicle image from which to initiate image segmentation.

24. The computer-readable storage medium of claim 21 wherein the program code for extracting includes code for comparing motion of the vehicle image segmented from the plurality of moving objects images remaining in each of the plurality of images to the substantially stationary background.

25. The computer-readable storage medium of claim 21 further comprising program code for accessing a memory wherein said memory includes a plurality of attributes associated with each of a plurality of vehicles and wherein at least one of the plurality of attributes includes physical dimensions of each of the plurality of vehicles.

26. A portable image based classification device comprising:

an image capture device for identification of at least one moving object with respect to a substantially stationary background;

a rangefinder for determining a distance between said at least one moving object and the image capture device; and a processor operatively coupled to said image capture device and said rangefinder, wherein said processor is operative to distinguish said at least one moving object from said stationary background, convert image data associated with said at least one moving object to actual physical dimensions of said at least one moving object and classify said at least one moving object based upon said actual physical dimensions.

27. The portable image based classification device of claim 26 wherein said image capture device, said rangefinder and said processor are housed in a hand-held unit.

28. The portable image based classification device of claim 26 wherein said image capture device, said rangefinder and said processor are battery powered.

29. The portable image based classification device of claim 26 wherein said rangefinder is a laser rangefinder.

30. The portable image based classification device of claim 26 wherein said processor is further operative to segment a plurality of images and differentiate said at least one moving object from other moving objects against said stationary background.

* * * * *